3,059,002
DRYING OILS

Eugene Bortnek, Newark, and Joseph A. Vona, Westfield, N.J., assignors to Celanese Corporation of America, New York, N.Y., a corporation of Delaware
No Drawing. Filed May 4, 1960, Ser. No. 26,706
6 Claims. (Cl. 260—405)

This invention relates to the improvement of drying oils and particularly drying oils having secondary hydroxyl groups on unsaturated fatty acid chains. It finds its greatest applicability in the improvement of dehydrated castor oil.

Castor oil is largely composed of glyceryl tri-ricinoleate and is not a drying oil. Ricinoleic acid contains one double bond and one secondary hydroxyl group. When castor oil is dehydrated, most of the secondary hydroxyl groups are removed and additional unsaturation is introduced. Dehydrated castor oil is a drying oil with a more rapid drying rate than linseed oil, but the final film is not as hard.

It is an object of this invention to improve dehydrated castor oil and other drying oils having secondary hydroxyl groups on unsaturated fatty acid chains so that they produce films of better hardness, color and color retention, gloss and gloss retention, chemical and water resistance and weathering characteristics.

We have found unexpectedly that the drying and resistance properties of these materials may be substantially improved by treating them with beta propiolactone (the lactone of beta hydroxy propionic acid).

While our invention is not limited to coatings, it is convenient, in describing the characteristics that are modified, to do so in terms normally associated with coatings. For example, properties of a film such as rate of drying, time for it to become tack-free, shrinkage during drying, hardness, water resistance and other concomitant and related properties are important in a coating. Moreover, several of these properties are considerations in the suitability of formulations for use as molding or laminating materials.

An improvement in any of the above properties of a coating or any such material is herein referred to in the specification and claims as an improvement in the "drying or resistance" properties thereof. The term "coating" is used herein in the specification and claims to mean a film-forming coating composition as it exists either prior to or after its application to the surface to be coated.

In addition to dehydrated castor oil, other drying oils which may be improved in accordance with our invention include oiticica oil and isano oil. Icano oil contains isanolic acid which has a secondary hydroxyl group and in oiticica oil the licanic acid contains a keto group which isomerizes in part to form a secondary hydroxyl group.

The invention is most suitably applied to drying oils having an iodine number of at least 100 and preferably between 120 and 180 and having a hydroxyl number between 20 and 50, although oils having a hydroxyl number as high as 200 may be treated.

In the commercial production of dehydrated castor oil, raw castor oil is catalytically dehydrated in an acid medium at an elevated temperature. A small percentage of raw castor oil does not react, giving to the product residual secondary hydroxyl groups and undesirable drying and resistance properties which may be improved through use of our invention.

It is preferable to include a drier in the preparation of coatings from the improved dehydrated castor oil. Suitable driers include compounds, and particularly the soaps of varivalent metals. Among the suitable driers are cobalt naphthenate, lead naphthenate, cobalt oleate, manganese oleate and the cobalt, lead and manganese soaps of tall oil acids.

The improved drying oils of our invention may be utilized for any of the uses of other drying oils including the production of a variety of types of coatings, including lacquers, varnishes, enamels and paints. They are particularly useful where the coating is to be air-dried or heat-hardened.

The coating may also include pigments or dyes, diluents, solvents, stabilizers, and other materials conventionally used by those skilled in the art.

The modification of the residual hydroxylated material with the lactones of our invention may be made immediately after the dehydration by the oil processor or immediately before curing by the user.

The amount of residual hydroxyl in the material to be treated in accordance with our improved method will, of course, vary. Ordinarily, as stated above, such material will have a hydroxyl value between about 20 and about 50. Generally, the amount of lactone used will depend on the amount of residual hydroxyl present in the material, with the preferable range being from about 1 to 1.2 mols of lactone per hydroxyl group.

Generally, it will be found desirable to heat the material with the lactone in the temperature range of 100° C. to 450° C. for from two to ten hours, or until the viscosity of the oil reaches the desired level.

If the lactone is to be heated with the material to be treated, it will generally be preferable to carry out the heating under an inert atmosphere such as nitrogen in order to avoid oxidation of the oil.

The following example will further illustrate our invention.

Example 1

Commercial dehydrated castor oil, having a hydroxyl value of about 25, was heated under a nitrogen atmosphere with about 5% beta propiolactone (by weight based on the castor oil) for about 2 hours at a temperature of 200° to 225° C. Another sample of the same dehydrated castor oil, unmodified with the lactone, was similarly heated. The oil heated with the beta propiolactone was lighter in color than the oil heated without it.

Driers (0.5% lead naphthenate and 0.05% cobalt naphthenate) were added to each of the two samples and also to a third sample of unmodified, unheated dehydrated castor oil. Films from each sample were drawn on glass.

After 1 hour at 77° F. in the air the latter two samples, which were not modified with the lactone, showed considerable shrinkage whereas no significant shrinkage was observed with the film from the first sample which was modified with the lactone. After drying in air overnight, and also after two weeks at 77° F., the lactone modified film was less tacky than the other films. This showed that treatment with the lactone improved the drying and resistance properties of this drying oil.

It is to be understood that the foregoing detailed description is given merely by way of illustration and that many variations may be made therein without departing from the spirit of our invention.

Having described our invention what we desire to secure by Letters Patent is:

1. The method for improving a drying oil having secondary hydroxyl groups on unsaturated fatty acid chains which comprises reacting said drying oil with beta propiolactone.

2. The method of claim 1 wherein such drying oil is dehydrated castor oil.

3. The method of claim 2, wherein such lactone is blended with said drying oil in an amount between 1 and 1.2 moles of lactone per hydroxyl group on said drying oil and reacted at a temperature between about 150° and 450° C. for a period between about two and ten hours.

4. The reaction product of a drying oil having secondary hydroxyl groups on unsaturated fatty acid chains with beta propiolactone.

5. An admixture of a drying oil having secondary hydroxyl groups on unsaturated fatty acids and beta propiolactone.

6. An admixture of dehydrated castor oil and beta propiolactone.

References Cited in the file of this patent

UNITED STATES PATENTS 2,929,827     Carruthers _____ Mar. 22, 1960